US008709518B2

(12) United States Patent
Young Jones

(10) Patent No.: US 8,709,518 B2
(45) Date of Patent: Apr. 29, 2014

(54) FLUID INTAKE AND CONTENT MANAGEMENT SYSTEM

(76) Inventor: Diane Young Jones, Lexington, KY (US)

( * ) Notice: Subject to any disclaimer, the term of this patent is extended or adjusted under 35 U.S.C. 154(b) by 464 days.

(21) Appl. No.: 13/226,801

(22) Filed: Sep. 7, 2011

(65) Prior Publication Data

US 2013/0060224 A1 Mar. 7, 2013

(51) Int. Cl.

| | |
|---|---|
| ***A61J 7/04*** | (2006.01) |
| ***A61J 9/00*** | (2006.01) |
| ***A61J 9/06*** | (2006.01) |
| ***B65D 25/00*** | (2006.01) |
| ***B65D 47/06*** | (2006.01) |
| ***B65D 51/16*** | (2006.01) |
| ***B65D 83/00*** | (2006.01) |
| ***F25D 3/08*** | (2006.01) |
| ***G09F 9/00*** | (2006.01) |
| *G06F 11/00* | (2006.01) |
| *G09F 11/23* | (2006.01) |

(52) U.S. Cl.

USPC ............. 426/394; 426/87; 426/115; 426/117; 40/310; 40/311; 62/457.1; 116/323; 116/324; 116/308; 116/309; 116/311; 116/321; 116/315; 215/11.4; 215/11.5; 215/387; 215/388; 215/396; 206/459.1; 294/31.2; 220/367.1; 220/711; 220/713; 220/714; 220/717; 220/719; 220/758

(58) Field of Classification Search

CPC ................. A01J 9/00; A01J 9/04; A01J 9/06; A01J 9/08; A45F 3/16; A45F 3/18; A45F 5/10; A61J 7/04; A61J 7/0409; A61J 9/00; A61J 9/06; A61J 11/001; A61J 11/0015; A61J 11/002; A61J 11/04; A47J 41/0083; A47J 41/0088; A47J 41/0094; A47J 43/27; A47J 45/07; A47J 45/077; A47J 45/08; A47G 19/2205; A47G 19/2211; A47G 19/2216; A47G 19/2266; A47G 19/2272; A47G 21/18; A47G 21/185; B01J 8/067; B65D 23/00; B65D 23/001; B65D 23/10; B65D 23/104; B65D 23/108; B65D 23/12; B65D 25/32; B65D 25/48; B65D 47/06; B65D 47/061; B65D 47/2031; B65D 47/2081; B65D 51/16; B65D 51/1611; B65D 51/1622; B65D 51/1644; B65D 51/165; B65D 51/1683; B65D 51/245; B65D 81/3216; B65D 85/72; B65D 2203/00; B65D 2205/00; B65D 2517/0049; B65D 2525/289; B65D 2543/00046; B65D 2583/0404; B65D 2583/0409; F25D 3/08; F25D 3/005; F25D 2303/08; F25D 2303/0831; G05G 1/10; G09F 3/00; G09F 3/04; G09F 7/00; G09F 7/10; G09F 11/00; G09F 11/04; G09F 11/23

USPC ...................... 40/310, 311; 53/471; 62/457.1; 116/308, 309, 311, 312, 313, 315, 321, 116/323, 324; 206/459.1; 215/11.4, 11.5, 215/230, 386, 387, 388, 389, 396; 294/31.2; 220/367.1, 711, 713, 714, 220/715, 716, 717, 719, 755, 758, 759; 426/87, 115, 117, 394

See application file for complete search history.

(56) References Cited

U.S. PATENT DOCUMENTS

| | | | | |
|---|---|---|---|---|
| 2,450,949 | A * | 10/1948 | Gattuccio et al. | 116/308 |
| 2,789,002 | A * | 4/1957 | Nicholas | 294/33 |
| 3,696,919 | A * | 10/1972 | Miles | 206/221 |
| 3,818,858 | A | 6/1974 | Kramer et al. | |
| 4,548,157 | A | 10/1985 | Hevoyan | |
| 4,621,670 | A | 11/1986 | Yuen | |
| 4,860,684 | A | 8/1989 | Al-Harbi | |
| 4,943,017 | A * | 7/1990 | Ennis | 248/102 |
| 5,009,083 | A | 4/1991 | Spinos et al. | |
| 5,079,013 | A | 1/1992 | Belanger | |
| 5,129,238 | A * | 7/1992 | Schwartz et al. | 62/457.3 |
| 5,358,117 | A | 10/1994 | Adams | |
| 5,456,090 | A | 10/1995 | McCoy | |
| D365,251 | S | 12/1995 | Lo | |
| 5,529,179 | A | 6/1996 | Hanson | |
| 5,890,620 | A | 4/1999 | Belcastro | |
| 6,050,445 | A * | 4/2000 | Manganiello | 220/714 |
| 6,116,439 | A * | 9/2000 | Yaniv | 215/11.1 |
| 6,321,931 | B1 * | 11/2001 | Hakim et al. | 220/714 |
| 6,568,557 | B2 | 5/2003 | Fusco et al. | |
| 6,789,497 | B1 * | 9/2004 | Aiken | 116/308 |

| | | | | |
|---|---|---|---|---|
| 6,805,072 | B1 | 10/2004 | DeSano | |
| 6,931,885 | B2 | 8/2005 | Citrynell et al. | |
| 6,938,768 | B2 | 9/2005 | Ferretti et al. | |
| 7,061,832 | B1 | 6/2006 | Lansing | |
| 7,661,384 | B2 * | 2/2010 | Mataya | 116/311 |
| 7,762,423 | B2 | 7/2010 | Lieberman et al. | |
| 7,789,264 | B2 | 9/2010 | Hakim | |
| 7,810,348 | B2 * | 10/2010 | Shewchuk | 62/457.3 |
| 7,857,134 | B2 | 12/2010 | Koch | |
| 2003/0192468 | A1 * | 10/2003 | Goertzen | 116/309 |
| 2008/0168940 | A1 * | 7/2008 | Duer et al. | 116/324 |
| 2009/0211927 | A1 * | 8/2009 | Wu | 206/219 |
| 2010/0308003 | A1 * | 12/2010 | Morrill et al. | 215/11.4 |

* cited by examiner

*Primary Examiner* — Rena L Dye
*Assistant Examiner* — Danny Chen
(74) *Attorney, Agent, or Firm* — Michael Coblenz

(57) ABSTRACT

A system for managing the fluid intake of a person is disclosed. The system consists of multiple containers of various volumes, a common lid configured to incorporate a flow control valve, multiple flow control valves having varying flow rates, a date indicator ring incorporated circumferentially on said containers, a content indicator disposed on said lid, a chiller insert, and an optional slip on handle. The user selects a container based on the fluid needs of a person and a flow control valve based on the drinking ability of the person. The user fills the container with a drinkable fluid, and indicates the nature of the contents with the content indicator and the date of filling with the date indicator ring. The chiller insert allows the user to cool the contents without the possibility of dilution as with standard ice cubes.

13 Claims, 9 Drawing Sheets

FLUID INTAKE AND CONTENT MANAGEMENT SYSTEM

CROSS REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to a system for managing the fluid intake of a person. The system consists of multiple containers of various volumes, a common lid that fits all of the containers where the lid configured for the attachment of a removable flow control valve, multiple flow control valves having varying flow rates, a date indicator ring incorporated on the containers, a content indicator incorporated on the lid, a chiller insert, and an optional slip on handle. In the system, the user selects a container based on the fluid needs of a person (infant or infirm patient) and selects a flow control valve based on the drinking ability of the person. The user fills the container with a drinkable fluid, and indicates the nature of the contents with the content indicator and the date of filling with the date indicator ring. This allows subsequent identification of the type and age of the contents. The chiller insert allows the user to cool the contents without the possibility of dilution. The system also includes an optional slip on handle which allows the container to be easily held by a person with limited dexterity.

2. Description of the Related Art

There are numerous prior art spill proof drinking cups. These cups are designed to be used by very young children who have been weaned from a baby bottle or from breast feeding, but do not yet have the ability to drink from a standard cup without spilling. It is also common for these cups to be used by the infirm: people who have been injured and have reduced dexterity and the elderly with limited dexterity. These cups are often referred to as "sippy cups." Standard sippy cups are a cup with a lid that has a spout that is designed to be held in the child's mouth. The spout generally has a small hole to prevent a rapid flow of liquid. This serves two purposes. First it prevents a rapid flow of liquid into the child's mouth while drinking, but it also prevents excess spilling of the contents of the cup and prevents a mess in the very common event that the child drops or knocks over the sippy cup. Examples of prior art spill proof cups are shown in U.S. Pat. Nos. 2,876,772; 3,967,748; 4,135,513; 4,836,404; 4,946,062; 5,050,758; 5,079,013; 5,186,347; 5,339,982; 5,542,670; 5,607,073; 5,706,973; and 5,890,621.

Standard sippy cups are not, however, completely spill-proof. It is common for small children, or people with limited dexterity, to knock over the cup or lose their grip and allow the cup to fall. It is also not uncommon for small children to simply turn the cup upside down to see what will happen. With standard sippy cups, liquid will flow from the small drinking hole in the spout. To help minimize these spills a one way hydrophobic diaphragm is often incorporated into the drinking hole. There are a number of prior art patents describing various diaphragms or membranes to prevent inadvertent liquid flow from sippy cups, including U.S. Pat. Nos. 5,890,620 and 6,568,557. The diaphragm prevents liquid from flowing through the drinking hole without some pressure, and the pressure is provided by the child during drinking. These cups typically include diaphragms with varying sized openings to allow different rates of flow. As the child ages he or she is able to drink with less suction, and larger diaphragms can be used.

One problem encountered by parents of small children, or care takers of the infirm, is the need for a variety of different sized cups. As a child ages, he or she is able to drink more liquid. so it is very common for a parent to purchase small cups for infants, and then as the child ages the parent needs to buy cups of increasing capacity. Typically a parent will begin with a 4 oz cup, then move up to a 6 oz cup, and finally an 8 oz cup. Typically each sippy cup comes with its own lid, and it is common for the lids from one size cup to not fit larger cups. Cups from different manufacturers virtually never fit the same lid, and it is often common for different sized cups from the same manufacture to have different sized lids. This means that parents (or other caregivers) are required to buy not only a new larger capacity cup, but also new lids for each cup. There is a need, therefore, for a cup system with varying size cups and a single spill proof lid that fits all sized cups.

It is very common for a parent to fill a sippy cup with a liquid for a child to drink and for the child to not finish the drink, and then for the parent to place the sippy cup into the refrigerator to prevent the contents of the cup from spoiling. This is also common in the case of the ill and elderly. It is not uncommon for a parent, or a caregiver, to have multiple sippy cups in the refrigerator at any one time. In those situations it is often difficult to determine when which cup was filled or last used. There is a need, therefore, for a system to indicate when a sippy cup has been filled. Most sippy cups are made from an opaque material, so it is often difficult to determine the contents of the sippy cup without removing the lid, which can cause spilling. There is a need, therefore, for a system to indicate the contents of the sippy cup.

The most common contents of a sippy cup are milk or juice, and milk and juice can quickly spoil particularly when it is hot outside. Parents will typically refrigerate the sippy cup after filling it with a drinkable liquid, or will fill it with the cooled liquid just before use. However if a child is outside on a warm day for any length of time there is always the possibility that the milk will become warm and may spoil. It is not uncommon to use ice cubes to cool juice, but the ice will dilute the juice, and it is not uncommon for children to refuse to drink diluted juice. There is the need, therefore, for a device to ensure the continued cooling of the sippy cup contents without the possibility of diluting the contents.

Most sippy cups are roughly cylindrical or have a beveled cylindrical or frustoconical shape, with a diameter of approximately three inches. While this is the size of a standard drinking cup and is quite easy for an adult to hold, it is often quite difficult for very small children to hold the standard sippy cup with one hand. It can also be quite difficult for the infirm or those with limited dexterity to hold a cup with one hand. Most children, and many infirm patients, hold the cup with two hands, but often attempt to hold the cup with one hand, causing frequent drops and spills. There are numerous prior art sippy cups with handles, but these handles are often fixedly attached and in only one position. There is the need, therefore for a removably attachable handle that can be attached with the handles extending either upward or downward.

SUMMARY OF THE INVENTION

The invention is a system for managing the fluid intake of a person. The invention includes a spill proof cup with an incorporated date indicator ring to show the date that the contents were added to the cup, and with a content indicator to show the nature of the contents. The invention also includes a series of removable and replaceable flow control valves to allow different flow rates. The invention further includes a screw in chiller insert that can be removably attached to the underside of the lid to provide cooling to the contents of the cup. The invention additionally includes a handle that is attachable to the cup.

The date indicator ring of the present invention allows the parent or care giver to indicate the day of the week that the cup was filled so that it will be easy to later determine how long the contents have been in the cup. The content indicator will indicate the nature of the contents, whether milk, juice, or other type of drink. The screw in chiller insert provides additional cooling to prevent spoiling of the contents of the cup, without the possibility of dilution.

The invention further includes a series of different sized cups with a uniform sized lid, and with multiple, interchangeable flow control valves. The system allows a care giver to use a single system as the child ages and as the child's drinking capacity and ability increases. With this system the parent can start the child with the smallest sized cup and lowest flow rate flow control valve, and as the child ages and matures and as the child's drinking capacity increases the parent can move up to a larger sized cup, and as the child's drinking skills improve the parent can switch to a flow control valve with an increased flow capacity. The system similarly allows the care-taker of an infirm person to manage their fluid intake based on their drinking ability.

DETAILED DESCRIPTION OF THE INVENTION

Detailed embodiments of the present invention are disclosed herein. It is to be understood that the disclosed embodiments are merely exemplary of the invention, and that there may be a variety of other alternate embodiments. The figures are not necessarily to scale, and some features may be exaggerated or minimized to show details of particular components. Therefore, specified structural and functional details disclosed herein are not to be interpreted as limiting, but merely as a basis for teaching one skilled in the art to employ the varying embodiments of the present invention.

Figure 1:
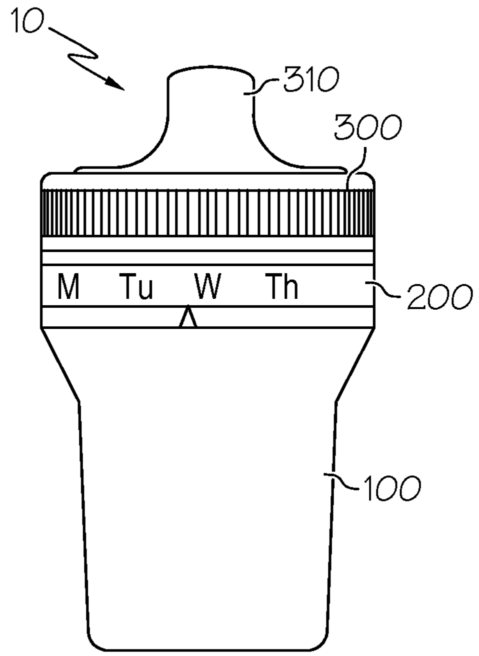
FIG. 1 is a front view of the date and content indicator cup with the date indicator ring.
Figure 2:
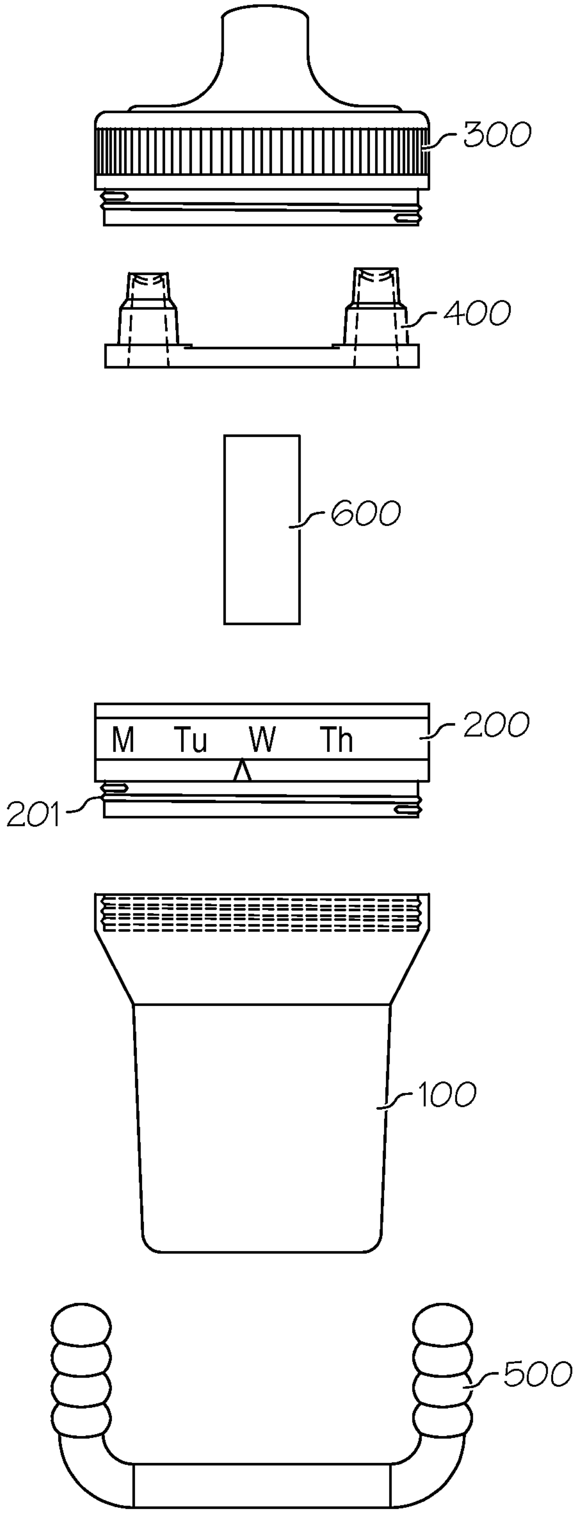
FIG. 2 is a exploded front view showing the main components of the invention.

FIG. 1 is a front view of the date and content indicator cup 10. FIG. 2 is an exploded view showing the date and content indicator cup 10 which is comprised of a container 100, a date indicator ring 200, a lid 300 with a spout 310, a flow control assembly 400 that controls the flow of liquids through the spout 310, an optional chiller insert 600, and an optional handle 500. The date indicator ring 200 is a cylindrical ring with the same circumference as the top of the container 100, and that is attached to the container 100. The lid 300 is sized to attach to the date indicator ring 200. In one embodiment the date indicator ring 200 is molded contiguous with the container 100 as a single piece of molded plastic. In an alternate embodiment the date indicator ring 200 is attached to the container 100 by means of standard threading. In this configuration the container 100 includes internal threading 103 on the top inside of the container 100, and the indicator ring 200 has an extended threaded ring 201 that corresponds to the internal threading 103, such that the two components screw together in the conventional manner. In this configuration the indicator ring 200 has internal threads 203 on the top inside, and the lid 300 has external threads 302 on the bottom outside such that the two components screw together in the conventional manner. It is within the conception of the invention for the components to be removably attached in any other conventional manner, such as by a tight friction fit or standard bayonet joint. It is also within the conception of the invention for the date indicator ring 200 to be integrally incorporated into the lid 300, such as by molding. The container 100, date indicator ring 200 and lid 300 can be made of any appropriate material. Similar spill proof cups are made from polypropylene, or other similarly moldable plastic materials.

The container 100 is similar to a typical child's cup, having a base and cylindrical walls to form a vessel capable of retaining liquids. The container 100 can be a vessel of any volume. The diameter of the top of the container 100 is the same regardless of the content size of the container 100, so that a uniform lid 300 will fit any sized container 100. The volume of the container 100 is varied by adjusting the height of the container 100. In the disclosed invention there are multiple interchangeable containers 100 having different volumes. In the most preferred embodiment of the invention there are three separate interchangeable containers 100 capable of containing four ounces (4 oz), six ounces (6 oz), and eight ounces (8 oz) if liquid. This allows the date and content indicator cup 10 to be used with containers 100 of varying sizes, which allows the invention to be used as the child grows and requires increasing amounts of liquid.

Figure 3:
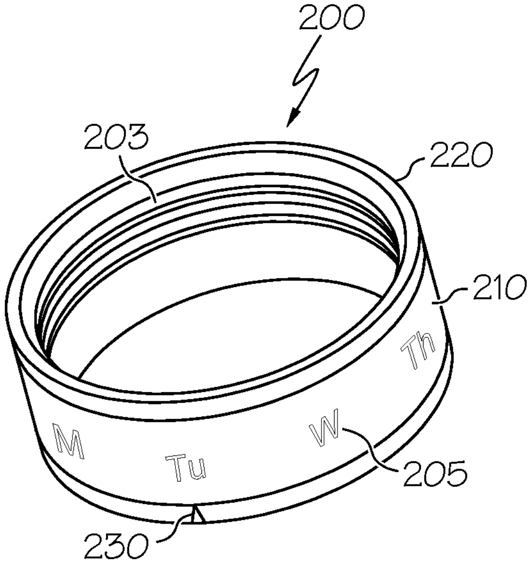
FIG. 3 is a perspective view of the date indicator ring.
Figure 4:
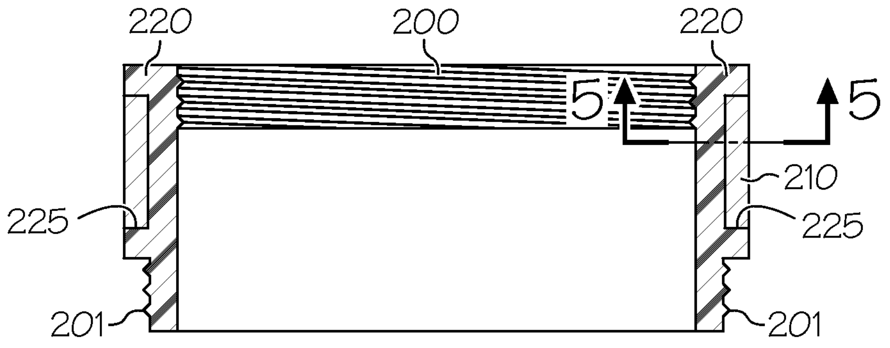
FIG. 4 is a cross section view of the date indicator ring.
Figure 5:
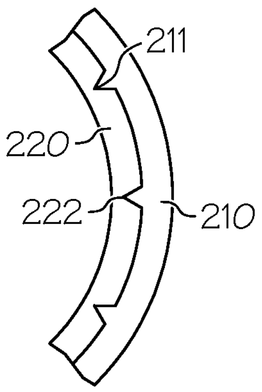
FIG. 5 is a sectional view of the date indicator ring.

As shown in FIGS. 3, 4 & 5, the date indicator ring 200 consists of a slip ring 210 mounted within a ring holder 220. The ring holder is an open ring having the same circumference as the top of the container 100. The ring holder 220 has a circumferential groove 225 that as sized to accommodate the slip ring 210. The slip ring 210 and the ring holder 220 are made of plastic or other suitable material. The slip ring 210 has a series of small ridges 211, and the ring holder 220 has a series of corresponding indents 222 such that the slip ring 210 is held into place, but can be moved around the ring holder 220. The material of the slip ring 210 is flexible enough to allow the slip ring 210 to flex which allows the ridges 211 to slid out of the indents 222, and then slide back in to "click" the slip ring 210 into place. There are a series of date indicators 205 spaced evenly around the outer circumference of the slip ring 210. In the preferred embodiment the date indicators 205 are the seven days of the week, abbreviated (M, Tu, W, Th, F, Sa, Su), set out sequentially Monday through Sunday, and spaced evenly around the slip ring 210. There is an indicator arrow 230 mounted on the ring holder 220 to point at the date indicator 205 by turning the slip ring 210 to align the selected date to the indicator arrow 230 so that the user can note the day that the contents were introduced into the container cup 100. The indicator arrow 230 can be positioned either above or below the slip ring, 210. There is a circumferential lip with external threads 201 around the bottom of the date indicator ring 200. The external threads 201 are configured to attach to the internal threads 103 of the container 100, so that the date indicator ring 200 can be screwed into place on the container. Both the container 100 and the date indicator ring 200 are made from molded plastic, and the threading creates a water tight seal. In an alternate embodiment the date indicator ring 200 can be molded to, or permanently attached by other means to, the container 100.

Figure 6:
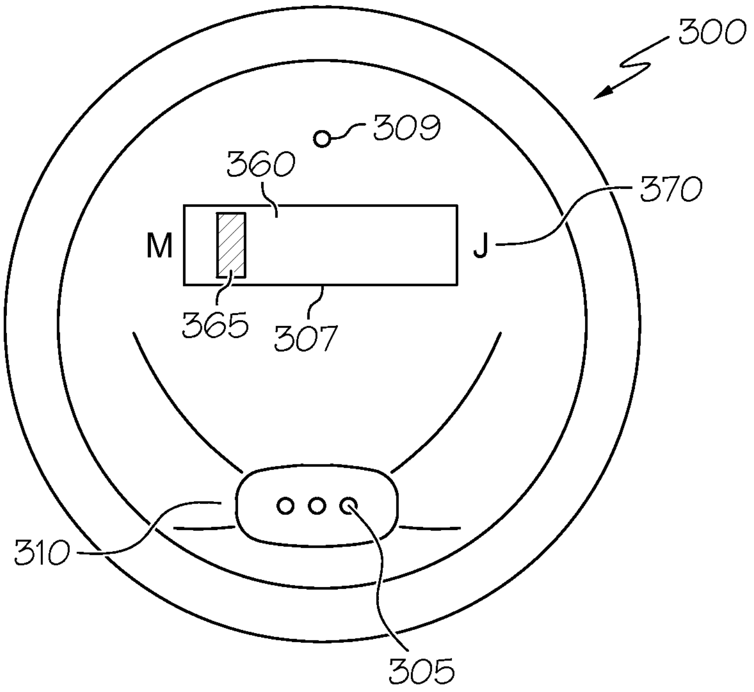
FIG. 6 is a top view of the lid showing the content indicator.
Figure 7:
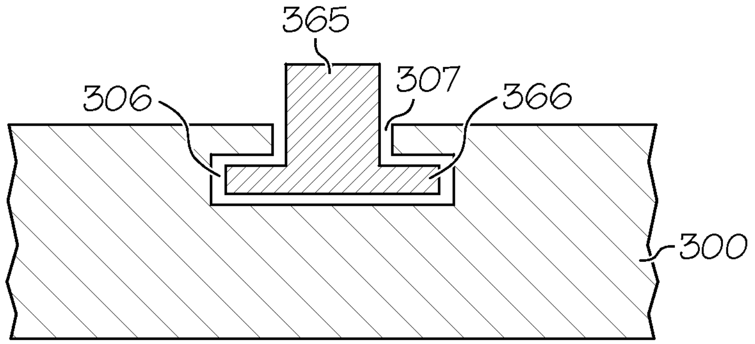
FIG. 7 is a cross section view of the workings of the content indicator.

There is a content indicator 360 mounted on the top of the lid 300, as depicted in FIGS. 6 & 7. In the preferred embodiment the content indicator 360 includes a slip lever 365 that slides from one position to another. As shown in the cross section view of FIG. 7, there is a groove 306 molded into the lid 300, with an elongated opening 307, and the slip lever 365 is mounted into the groove 306. The slip lever 365 is held into place by slide plate 366 that slides into the groove 306. The slip lever 365 is an extending tab mounted on the slide plate 366, and the slide plate 366 is held within the groove 306. The slip lever 365 slides in the elongated opening 307. In one embodiment there are tabs and detents in the groove 306 to temporarily hold the slip lever 365 in place in various positions within the elongated opening 307. There are indicator letters 370 to indicate the contents of the container 100. In the preferred embodiment there is an "M" (to indicate milk) on one side of the content indicator 360, and a "J" (to indicate juice) on the other side of the indicator 360. This allows the user to indicate if the contents of the container is milk or juice by sliding the slip lever 365 to one side of the content indicator 360 or the other. In other embodiments the indicator letter can be "M" (for Milk) and "O" (for other). In an alternate embodiment there is a third indicator letter 370 located in the middle of the content indicator 360. In this embodiment "M" is on one side, "O" is in the middle, and "J" is on the other end. Other letters can be used to indicate contents in different or specialized situations, for example with foreign languages. It is within the conception of the invention to include more possible letters to indicate other possible contents. It is also within the conception of the invention for the content indicator to be a dial, a lever or push buttons.

Figure 8:
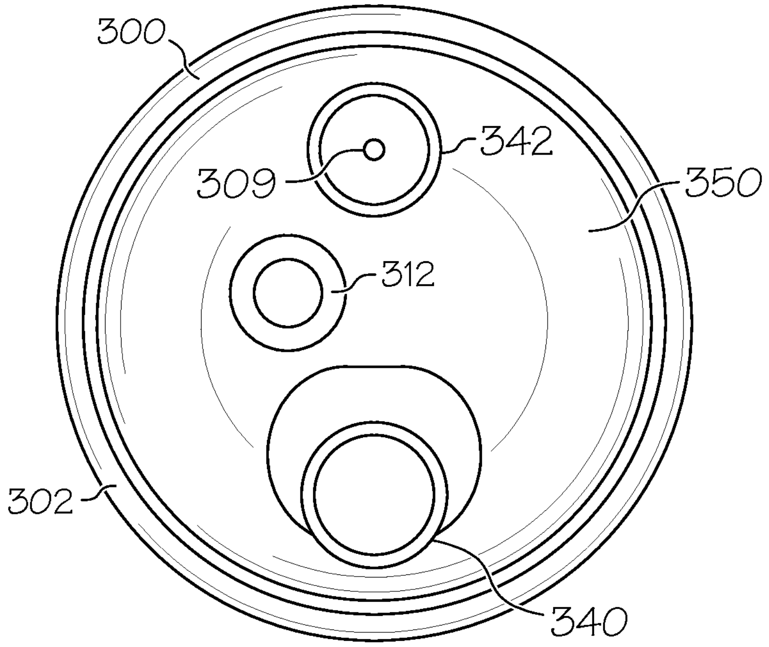
FIG. 8 is a bottom view of the lid showing the collars and the chiller insert attachment.
Figure 9:
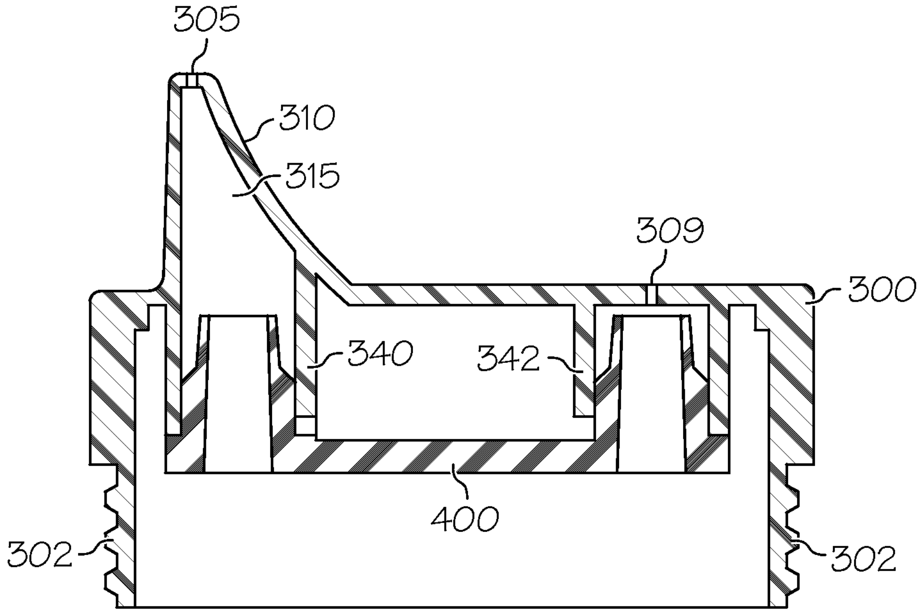
FIG. 9 is a cross section view of the lid showing the flow control assembly inserted into the collars.

As seen in detail in FIGS. 6, 8 & 9, the lid 300 has a spout 310 molded as an integral part of the lid 300, which is formed from a rigid plastic material such as polypropylene or other suitable material. The spout 310 has a passage 315 formed on the underside 350 of the lid 300 that allows liquid to be drawn from the container 100 into the mouth of the toddler drinking from the cup. The lid 300 also has a vent opening 309 spaced away from the spout 310, through which air can flow into the container 100 to equalize pressures inside and outside the cup assembly 10 so that liquid can be readily drawn from it through the spout 310. There are a number of apertures 305 in the top of the spout 310 to allow liquid to flow from the passage 315 into the mouth of the child drinking from the cup. In the preferred embodiment there are three small apertures 305, but it is possible, and within the conception of the invention to have one larger aperture 305, or have a number of smaller apertures 305 with as few as two and as many as four or more. In the preferred embodiment the spout 310 protrudes up from the top of the lid 300, as shown in FIGS. 1 & 9, so that it provides a mouth piece that is easy for small children to use. But it is possible, and within the conception of the invention, for the spout 310 to be level with the top of the lid 300, much like the familiar coffee cup lids, and which approximates the configuration of a standard drinking glass so that older children can drink from the cup 10 in much the same manner as if drinking from a standard cup. The lid 300 has an externally threaded lower lip 302 that is configured to be attached to the internal threads 203 or 103 of either the date indicator ring 200 or the container 100. This allows the lid 300 to be attached either directly to the lid 100, or in the preferred embodiment, to the date indicator ring 200.

As shown in FIGS. 8 & 9, the passage 315 on the underside 350 of the lid 300 terminates in a passage collar 340 that receives the flow control assembly 400 that prevents the liquid in the container 100 from flowing out of it through the passage 315 and apertures 305 unless a child is sucking on the spout 310 so as to produce a low pressure region on the outlet side of the passage 315 downstream of the assembly. A vent collar 342 is formed on the inner surface of the lid 300 as an integral part thereof and surrounds the vent opening 309. The vent collar 342 also receives the flow control assembly 400 as described below. The passage collar 340 and vent collar 32 are cylindrical recesses formed of the same molded material as the lid 300, and have the same diameter and depth.

Figure 10:
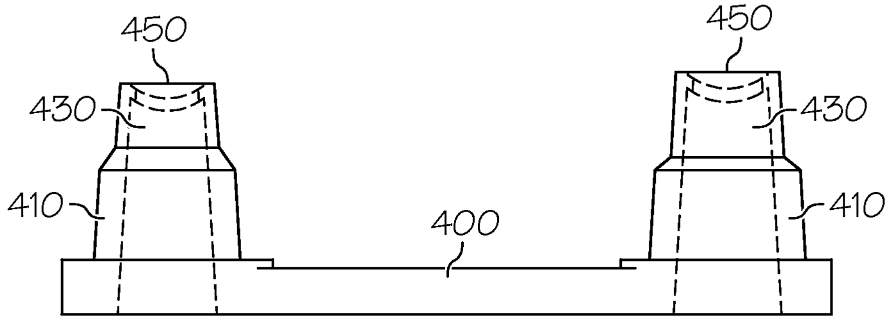
FIG. 10 is a cross section view of the flow control assembly.
Figure 11:
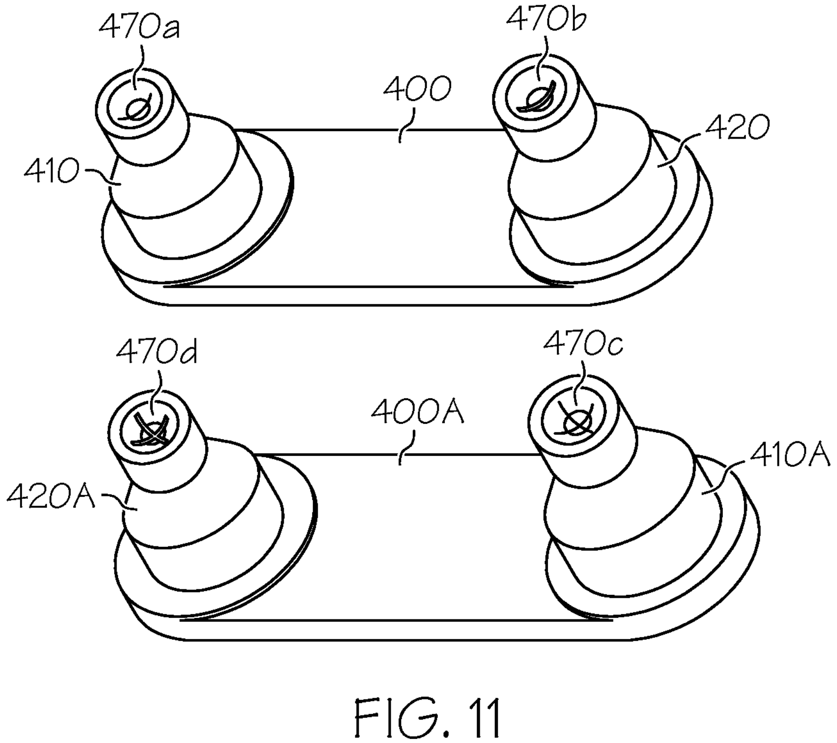
FIG. 11 is a perspective view of multiple flow control assemblies with diaphragms having variable flow rates.

The flow control assembly 400, shown in cross section in FIG. 10 and in perspective view in FIG. 11, in the preferred embodiment of this invention is a hydrophobic membrane that is sized to be removably attached to the lid 300 immediately below the vent hole 309 and the passage 315 to cover them and restrict the flow of liquid. As is well known in the art, the hydrophobic membrane allows air to pass through, but prevents the flow of liquid. As a result, there is constant air communication between the exterior and interior of the cup 10 so as to prevent a low pressure region (partial vacuum) from forming in it that would retard or prevent liquid from being drawn from the container 100 through the spout 310. However, the flow control assembly 400 will prevent liquid in the container 100 from spilling out through the vent opening 309 or through the passage 315 and through the spout 310 should the cup 10 be turned over or otherwise assume a position that causes the liquid to flow toward the openings.

In the preferred embodiment the flow control assembly 400 is formed from a single piece of elastomeric material, which facilitates the easy insertion of the flow control assembly 400 into and removal from corresponding passage collar 340 and vent collar 342. The elastomeric material used is most preferably silicone, but other similar materials may also be used, such as TPE (thermoplastic elastomer), natural rubber, and synthetic rubbers such as isoprene. The flow control assembly 400 is configured to fit snuggly, as shown in FIG. 9, within the passage collar 340 and vent collar 324 to create a nearly spill proof cup 10. The flow control assembly 400 has a first cylindrical stack 410 and a second cylindrical stack 420 that are sized and spaced to be received securely into the passage collar 340 and the vent collar 342. The first stack 410 and second stack 420 are hollow, with an internal passage 430 to allow the flow of air and liquid, and are the same configuration (height and diameter) except for the size of the diaphragm valve 470 in the top 450 of the stacks. The passage collar 340 and the vent collar 342 are similarly shaped, and the first stack 410 and second stack 420 are shaped to be snugly fit within either the passage collar 340 or the vent collar 342. In other words, the first and second stacks 410 & 420 are interchangeable within the passage collar 340 and the vent collar 324. The different sized diaphragms 470 allow the care giver to change the flow rate of the cup 10 by simply reversing the flow control assembly 400.

The size of the diaphragm 470, which is a slit in the elastomeric material on the top of the protrusions 410 and 420, will control the flow rate of liquid through the passageway 315 and the drinking rate for the child. As described in detail in U.S. Pat. No. 6,050,445, a small slit will result in a low flow rate, and as the length of the slit increases the flow rate will increase. A cross slit will increase the flow rate significantly, as will multiple cross slits. As seen in FIG. 11, the invention includes at least two flow control valves 400 & 400A. These multiple flow control valves 400 are identical in every regard except for the size, and hence the flow rate, of the diaphragm valve 470 on the top 450. The smallest diaphragm 470*a* has the lowest flow rate, and is appropriate for small children who have been recently weaned and have a limited drinking capacity. As the child grows and his or her drinking ability improves, the child can drink at a faster rate, and as a result a diaphragm 470 with a larger slit can be used. The diaphragms 470*a* & 470*b* are paired on the flow control valve 400 so that the next sized diaphragm 470*b* can be easily switched with the smallest diaphragm 470*a*. The second flow control valve 400A has the next two sized diaphragms, an intermediate sized diaphragm 470*c* and the largest diaphragm 470*d*. As the child ages it is easy for the parent to switch to the next sized diaphragm 470. Each sized diaphragm 470 allows sufficient air flow through the vent hole 309 to prevent the build up of pressure in the container 100.

Figure 12:
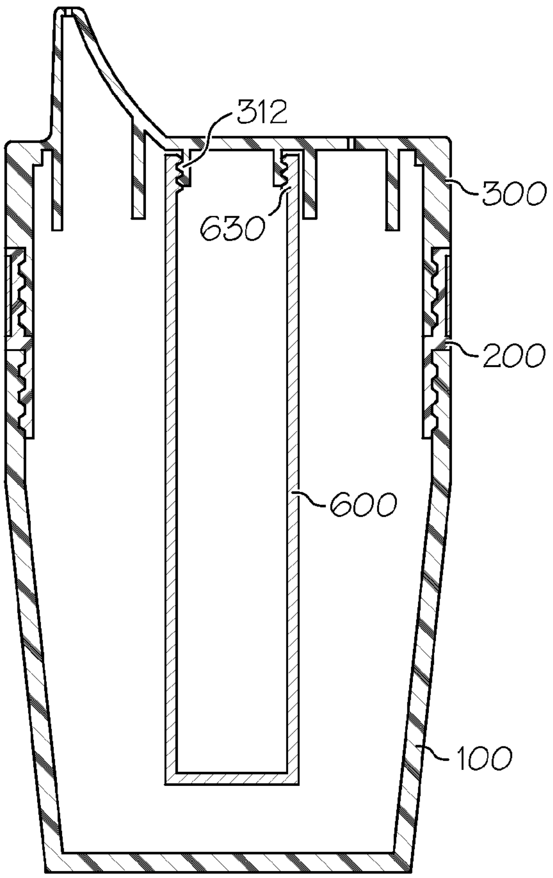
FIG. 12 is a cross section view of the cup with the chiller insert.
Figure 13:
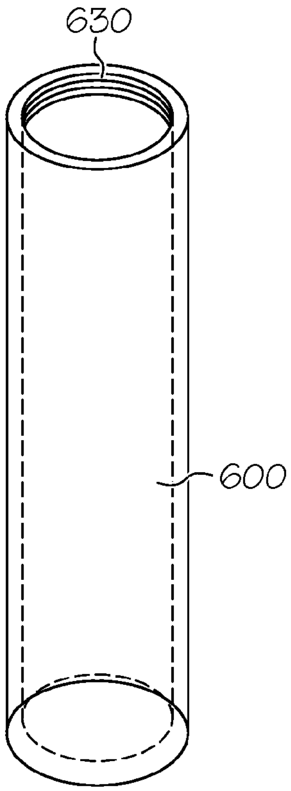
FIG. 13 is a perspective of the chiller insert.

As seen in FIG. 12, in at least one embodiment the lid 300 is configured to accommodate a chiller insert 600. The chiller insert 600, as shown in FIG. 13, is a hollow tube made of plastic or other suitable material and that can accommodate a heat transfer medium, such as chilled or frozen water, or other suitable refrigerant materials, for chilling the liquid contents of the container 100. (In the technical thermodynamic process the chiller insert 600 absorbs heat from the liquid.) In the preferred embodiment the chiller insert has a threaded portion 630 located on the top of the chiller insert 600. The threaded portion 630 attaches to a threaded attachment 312 located on the underside 350 of the lid 300. The threaded attachment 312 is a squat raised bolt molded from the same material as the lid 300, and in most cases molded in the same process as the lid 300. As seen in FIG. 8, the threaded attachment 312 is offset from the center of the lid 300 so that it does not conflict with the flow control assembly 400 when it is inserted into the collars 340 and 342. The connection between the threaded portion 630 and the threaded attachment 312 creates an essentially water tight seal, and prevents the liquid in the chiller insert 600 from leaking into the container 100. In this configuration the chiller insert 600 will extend down and into the container 100 such that it will be placed in the liquid held within the container 100. This will allow the contents of the container 100 to be cooled, and in those cases where the contents are a perishable liquid such as milk, will allow the contents to remain fresh for an extended length of time. In the preferred embodiment the chiller insert 300 is a hollow tube, and the care giver can fill the chiller insert 600 with water and store it in the freezer to allow the water to freeze. In an alternate embodiment the chiller insert 600 can have a pre-filled endothermic material within the chiller insert 600 such as a glycol-water mixture, or other endotherm producing chemicals.

Figure 14:
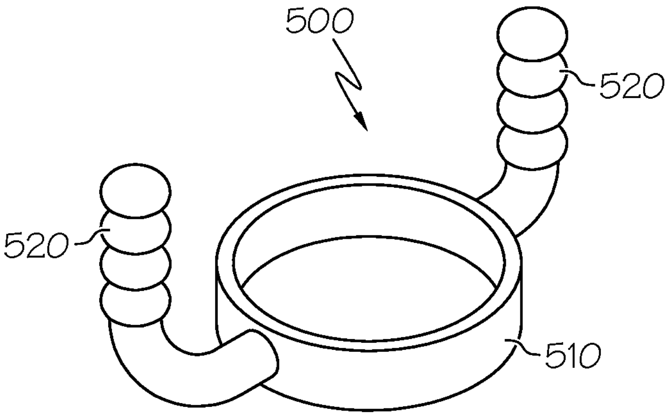
FIG. 14 is a perspective view of the handle.
Figure 15:
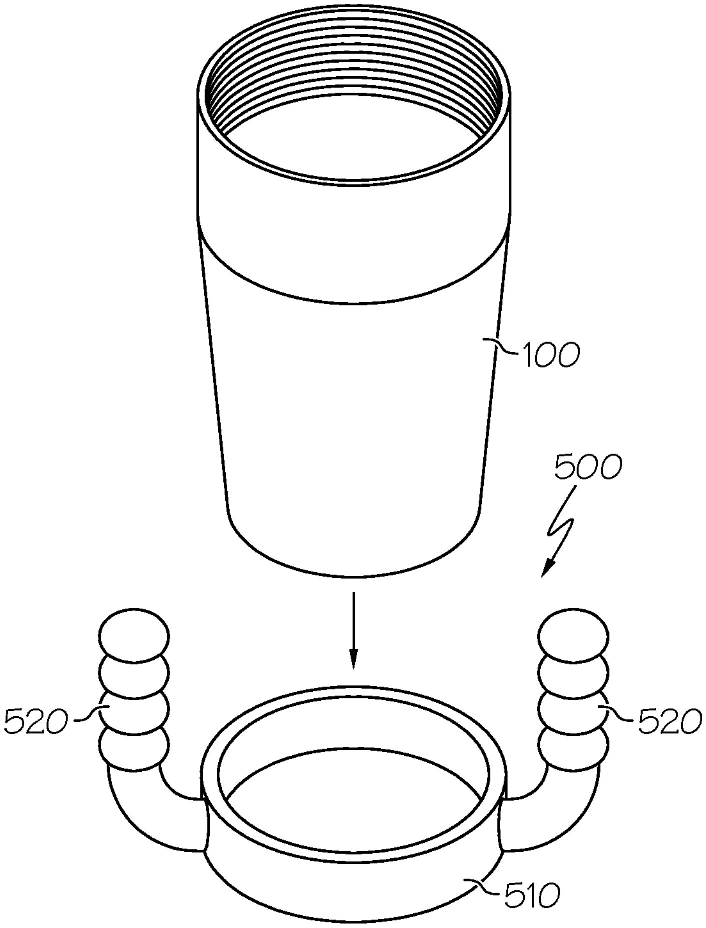
FIG. 15 is a front explodes view of the handle and the container.
Figure 16:
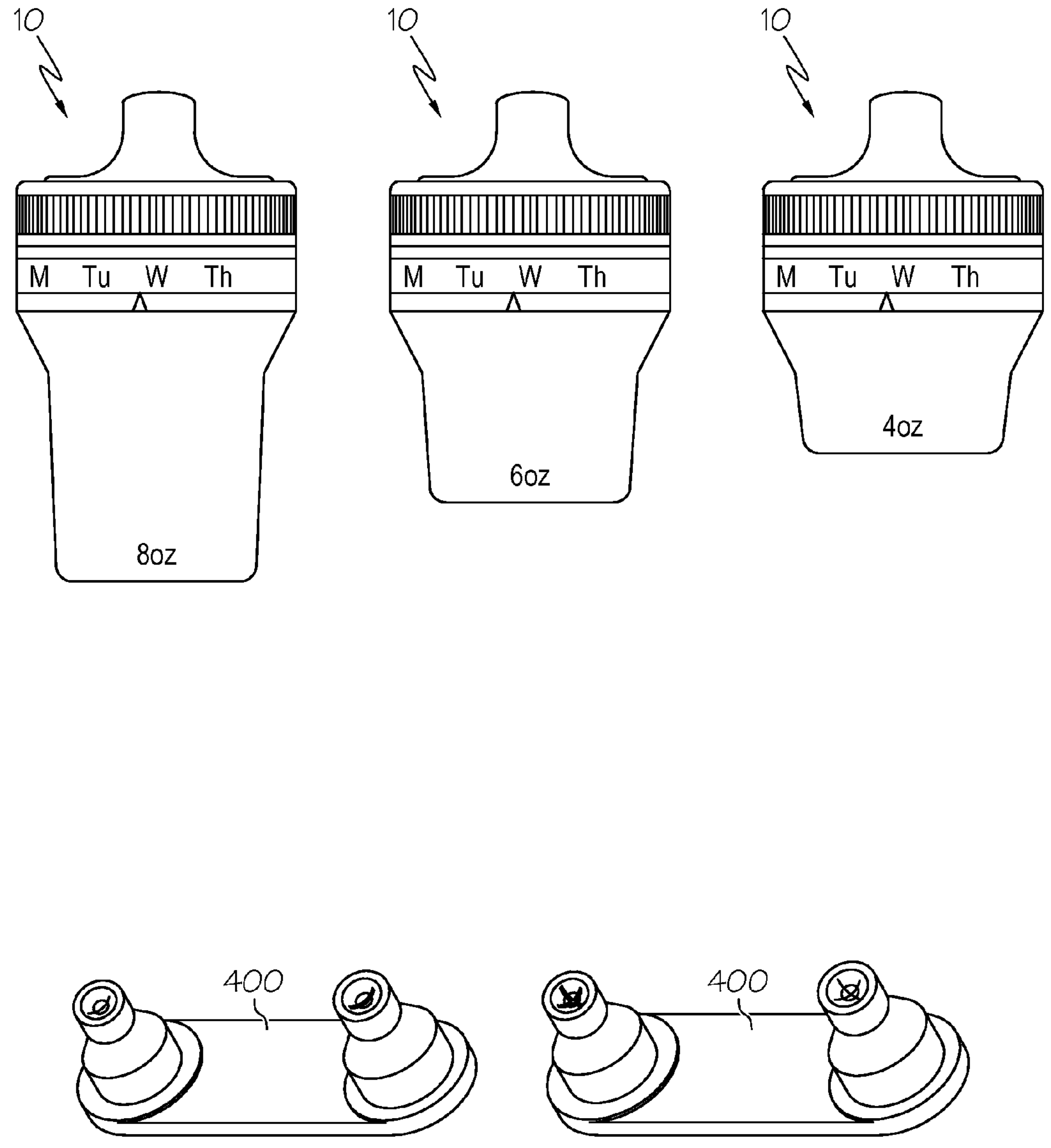
FIG. 16 is a view of the elements of the drink control system.

As seen in FIGS. 14 and 15, a handle 500 can be incorporated with the cup 10. The handle 500 consists of an attachment band 510, and two hand grips 520 attached to the band 510. The band 510 is made from an elastomeric material such as rubber or other suitable material with good stretch properties. The band 510 is a loop with a circumference just slightly smaller than the circumference of the container 100 which allows the band 510 to be stretched and attached around the container 100 and remain in place with the natural tension of the band 510. As is well know when dealing with stretchable rubber bands, the band has a natural circumference and when stretched to a greater degree tension is created. The band 510 has a natural circumference smaller than the circumference of the container. This allows the handle 500 to be easily attached to the container 100 and easily removed, but held in place through the stretched tension of the band 510. The two hand grips 520 are attached to the band 510 on opposite sides such that they are on opposite sides of the container 100 when the band 510 is in place on the container 100. The hand grips 520 are made from a hard rubberized material, and in the preferred embodiment are covered with a softer material such as neoprene, to make the grips 520 easy to hold. The hand grips 520 are curved and can have small ridges to allow for easy gripping. The handle 500 is designed so that the two hand grips 520 can be disposed upward, or downward, depending upon the preference of the person holding the cup 10. In one embodiment the band 510 can be made from a material that can be written on. This will allow the parent or care giver to use multiple cups 10 and with multiple individuals. So, for example, the parent can write the name of one child on one handle 500, and another child on another handle 500, and place those on two cups 10, and then, as described above, denote when liquids were place into each cup 10 and also indicate the type of liquid in the cup FIG. 16 depicts the elements of the system of managing fluid intake through use of the spill proof cup 10. The fluid intake system consists of three container cups 100 and two flow control valves 400 having four different flow rate diaphragm valves 470. In the preferred embodiment the three container cups will come in volumes of 4 oz, 6 oz, and 8 oz. This allows the user, typically a parent of other care giver, to adjust the size of the container to the needs of the child or patient, as well as adjust the flow rate through the diaphragm valve 470 to the drinking ability of the user. So, for example, an infant just past the bottle stage (generally at about six months), will only be able to drink a small amount of fluid at any one time, and so will need a smaller sized container 100. The child just past bottle stage will also have a limited ability to suck from a drinking vessel, and so the flow control valve 400 with the smallest diaphragm valve 470 will be used. As the child grows, he or she will require larger amounts of liquid, and so the parent or caregiver can simply and conveniently switch to a larger sized container cup 100. This eliminates the need to purchase multiple “sippy cups” and avoids the problem of having multiple cups with multiple lids, most of which do not fit one another. In a similar manner, as the child’s drinking ability improves the parent or caregiver can simply and conveniently adjust the size of the flow control valve 400 to the drinking ability of the child. Finally, when the child is able to drink directly from a cup the lid 300 can be removed and the container 12 can serve as a standard drinking cup.

The child drinking cup system contains two flow control valves 400, with four separate sized diaphragm valves 470. The diaphragm valve 470 is a slit in the stack top 450. As is well known, the larger the slit of the diaphragm 470 the greater the amount of flow of a liquid through the valve. Each flow control valve 400 has two paired stacks 410 & 420, and in each pair there are diaphragm valves 470 of different sizes. With two flow control valves 400 there will be four different diaphragms 470 to allow a child to progress to a greater degree of flow and to allow a child to improve his or her ability to drink liquids. The smallest diaphragm 470*a* will be a small slit that will only allow a small amount of liquid to flow. The first flow control valve 400 will have a beginners, or low flow rate, diaphragm 470*a*, and an first intermediate, or medium low flow rate diaphragm 470*b*. The second flow control valve 400A will have a second intermediate, or medium high, flow rate diaphragm 470*c*, and an advanced, or high flow rate, diaphragm 470*d*. This will allow the parent or care giver to begin the child with a very slow flow rate valve, and then as the child ages, and as the child's drinking capacity and ability increase, the parent can increase the flow rate of the cup 10. When the child has grown sufficiently and acquired acceptable drinking skills, the flow control valve 400 can be removed completely. And when the child no longer needs the Sippy cup, the lid 300 can be removed, and because the threads 103 are inside rather than outside the top lip, the container 100 can be used as a standard cup.

The present invention is well adapted to carry out the objectives and attain both the ends and the advantages mentioned, as well as other benefits inherent therein. While the present invention has been depicted, described, and is defined by reference to particular embodiments of the invention, such reference does not imply a limitation to the invention, and no such limitation is to be inferred. The depicted and described embodiments of the invention are exemplary only, and are not exhaustive of the scope of the invention. Consequently, the present invention is intended to be limited only be the spirit and scope of the claims, giving full cognizance to equivalents in all respects.

I claim:

1. A method for managing the fluid intake of an individual comprising the steps of:

providing a multiplicity of cups of varying sizes, said cups having an opening;

providing a uniform spill proof lid having a spout to allow the flow of a liquid and a mounting means for a flow control valve to control the flow rate of said liquid;

providing a multiplicity of flow control valves of varying flow rates;

selecting one of the multiplicity of cups based on the fluid needs of an individual;

filling said one of the multiplicity of cups with a drinkable liquid;

selecting one of the multiplicity of flow control valves based on the drinking ability of the individual;

mounting said one of the multiplicity of flow control valves into said mounting means of said spill proof lid;

attaching said spill proof lid to enclose said opening of said cup;

disposing a date indicator ring circumferential with said cup, said date indicator ring containing date indicators and configured to rotate to align said date indicator with an indicator arrow to denote the date when said cup is filled with said drinkable liquid;

wherein said date indicator ring is attachably connected to said cup by means of a corresponding threaded attachment disposed on said date indicator ring and said cup, and wherein said spill proof lid can be attachably connected to said date indicator ring by means of a correspondingly threaded attachment disposed on said spill proof lid and said date indicator ring;

wherein said date indicator ring further consists of a ring holder with a circumferential groove and a indicator ring rotatably disposed within said circumferential groove, said indicator ring having date indicia evenly spaced circumferentially around said indicator ring and having a series of small ridges protruding towards said ring holder, said ring holder having a series of small grooves sized and spaced to correspond to said series of small ridges such that said indicator ring can be held in place within said ring holder but can be moved around said ring holder, and wherein said date indicator ring further consists of an indicator arrow, wherein said indicator ring can be rotated about said ring holder to align the date indicia to said indicator arrow to denote the date when the cup was filled with the liquid;

rotating said date indicator ring to align the date with the indicator arrow; whereby it will be known when said cup was filled with said liquid.

2. The method for managing the fluid intake of an individual of claim 1 comprising the further step of:

incorporating a content indicator on said spill proof lid, said content indicator including indicia denoting the possible contents to be introduced into the cup and a means for pointing to the indicia; and manipulating said means for pointing to the indicia to indicate the contents of the cup.

3. The method for managing the fluid intake of an individual of claim 1 comprising the further step of:

disposing an attachment point to underside of said spill proof lid;

providing a chiller insert configured to hold an endothermic material;

introducing said endothermic material into said chiller insert and chilling said chiller insert;

attaching said chiller insert to said attachment point, wherein said chiller insert protrudes into said cup, and;

attaching said spill proof lid to said one of the multiplicity of cups such that said chiller insert is disposed into said liquid, whereby said chiller insert chills said liquid.

4. The method for managing the fluid intake of an individual of claim 1 comprising the further step of:

providing a handle with a stretchable attachment band and more than one hand grips;

stretching said stretchable attachment band and placing it circumferentially on said cup, wherein the stretchable attachment band secures said more than one hand grip to said cup.

5. The method for managing the fluid intake of an individual of claim 1, wherein said multiplicity of cups have volumes of 4, 6 and 8 ounces.

6. The method for managing the fluid intake of an individual of claim 5, whereby a parent of a child or the caretaker of an infirm individual will be able to manage all of the child's or infirm individual's fluid intake needs with a single system of cups and flow control valves for the spill proof lid.

7. The method for managing the fluid intake of an individual of claim 1, wherein said spill proof lid has a vent hole and an underside having an open passage to said spout, wherein there is a passage collar disposed around said open passage on said underside of said spill proof lid and a vent collar disposed around said vent hole on said underside of said spill proof lid;

wherein said flow control valve has two identically sized stacks spaced and configured to engage said passage collar and said vent collar, said stacks have an internal passage to allow the flow of air or liquid through said valve, said stacks having a top with a slit to create a diaphragm, wherein the size of said slit controls the flow rate of said diaphragm, with the diaphragm of the first stack smaller than the diaphragm of the second stack; wherein said flow control valve is inserted into said collars to control the flow rate of said liquid from said cup; and whereby the flow rate can be adjusted by placing either the first or second stack in the passage collar.

8. The method for managing the fluid intake of an individual of claim 7, wherein there are two flow control valves, a first flow control valve having a low flow rate diaphragm and a intermediate flow rate diaphragm, and a second flow control valve having a medium rate flow control valve and an advanced rate flow control valve.

9. The method for managing the fluid intake of an individual of claim 2, wherein said content indicator is disposed on a top of said spill proof lid, wherein said spill proof lid includes a groove with an elongated opening, and wherein said content indicator consists of a slide plate mounted in said groove and an slip lever protruding through said elongated opening, said content indicator further including two indicator letters mounted at either end of said elongated opening, such that the content indicator will indicate the contents of said cup by positioning said slip lever adjacent one of the two indicator letters.

10. The method for managing the fluid intake of an individual of claim 3, wherein said attachment point is a threaded mount disposed off center of said spill proof lid, wherein said chiller insert has a threaded portion aligned to correspond to said threaded mount such that said chiller attachment can be removably attached to said spill proof lid; and wherein further said endothermic material consists of water introduced into said chiller insert and frozen.

11. The method for managing the fluid intake of an individual of claim 4, wherein said stretchable attachment band has a natural band circumference and a tension when stretched beyond the natural band circumference, wherein said cup has a cup circumference, and wherein said band circumference is smaller than said cup circumference such that said natural tension holds said band to said cup when said band is disposed on said cup.

12. The method for managing the fluid intake of an individual of claim 1, wherein said spill proof lid has a vent hole and an underside having an open passage to said spout, wherein there is a passage collar disposed around said passage on said underside of said spill proof lid and a vent collar disposed around said vent hole on said underside of said spill proof lid;

wherein said flow control valve has two identically sized stacks spaced and configured to engage said passage collar and said vent collar, said stacks have an internal passage to allow the flow of air or liquid through said valve, said stacks having a top with a slit to create a diaphragm, wherein the size of said slit controls the flow rate of said diaphragm, with the diaphragm of the first stack smaller than the diaphragm of the second stack; wherein said flow control valve is inserted into said collars to control the flow rate of said liquid from said cup; whereby the flow rate can be adjusted by placing either the first or second stack in the passage collar;

wherein further said multiplicity of cups have volumes of 4, 6 and 8 ounces; whereby a parent of a child or the caretaker of an infirm individual will be able to manage all of the child's or infirm individual's fluid intake needs and based upon the child's or infirm individuals drinking abilities, with a single system of cups and flow control valves for the spill proof lid.

13. A method for managing the fluid intake of a child or an infirm individual comprising the steps of:

providing a multiplicity of cups of varying sizes, said cups of varying sizes having an opening, wherein said cups of varying sizes are 4 ounces, 6 ounces, and 8 ounces;

providing a uniform spill proof lid having a spout to allow the flow of a liquid; said spill proof lid having a vent hole and an underside having an open passage to said spout and a passage collar disposed around said open passage on said underside of said spill proof lid and a vent collar disposed around said vent hole on said underside of said spill proof lid;

providing a first flow control valve and a second flow control valve having varying flow rates, said flow control valves having two identically sized stacks spaced and configured to engage said passage collar and said vent collar, said stacks have an internal passage to allow the flow of air or liquid through said valve, said stacks having a top with a slit to create a diaphragm, wherein the size of said slit controls the flow rate of said diaphragm, with the diaphragm of the first stack smaller than the diaphragm of the second stack, wherein said first flow control valve has a low flow rate diaphragm and an intermediate rate diaphragm, and said second flow control valve has a medium flow rate diaphragm and an advanced rate diaphragm;

disposing a date indicator ring circumferential with said cup, wherein said date indicator ring is attachably connected to said cup by means of a corresponding threaded attachment disposed on said date indicator ring and said cup, and wherein said spill proof lid can be attachably connected to said date indicator ring by means of a correspondingly threaded attachment disposed on said spill proof lid and said date indicator ring; said date indicator ring consisting of a ring holder with a circumferential groove and a indicator ring rotatably disposed within said circumferential groove, said indicator ring having date indicia evenly spaced circumferentially around said indicator ring and having a series of small ridges protruding towards said ring holder, said ring holder having a series of small grooves sized and spaced to correspond to said series of small ridges such that said indicator ring can be held in place within said ring holder but can be moved around said ring holder, said date indicator ring further consists of an indicator arrow, wherein said indicator ring can be rotated about said ring holder to align the date indicia to said indicator arrow to denote the date when the cup was filled with the liquid;

incorporating a content indicator on said spill proof lid, said content indicator comprises a groove with an elongated opening in said spill proof lid, said content indicator further consists of a slide plate mounted in said groove and an slip lever protruding through said elongated opening, said content indicator further including two indicator letters mounted at either end of said elongated opening, such that the content indicator will indicate the contents of said cup by positioning said slip lever adjacent one of the two indicator letters;

disposing a threaded mount off center of said underside of said spill proof lid providing a chiller insert configured to hold an endothermic material, said chiller insert having a threaded portion aligned to correspond to said threaded mount such that said chiller attachment can be removably attached to said spill proof lid;

introducing an endothermic material into said chiller insert and cooling said chiller insert;

attaching said chiller insert to said attachment point;

providing a handle with a stretchable attachment band and more than one hand grips, wherein said stretchable attachment band has a natural band circumference and a tension when stretched beyond the natural band circumference, wherein said cup has a cup circumference, and wherein said band circumference is smaller than said cup circumference such that said natural tension will hold said band to said cup when said band is disposed on said cup;

stretching said stretchable attachment band and placing it circumferentially on said cup to secure the handle to said cup;

selecting one of the multiplicity of cups based on the fluid needs of the child or infirm individual;

filling the selected one of the multiplicity of cups with a drinkable liquid;

selecting either said first control valve or said second flow control valve based on the drinking ability of the child or infirm individual;

mounting said one of the multiplicity of flow control valves into the vent collar and passage collar on the underside of said spill proof lid, wherein the flow control valve limits the flow of liquid from said cup;

attaching said spill proof lid to enclose said opening of said cup, wherein said chiller insert is inserted into said liquid to chill said liquid;

rotating the date indicator ring to align the date of filling with the indicator arrow, thereby denoting the date that the liquid was introduced into the cup;

sliding the slip lever of the content indicator to the indicator letter to indicate the contents of the cup;

whereby a parent of a child or the caretaker of an infirm individual will be able to manage all of the child's or infirm individual's fluid intake needs and based upon the child's or infirm individuals drinking abilities, with a single system of multiple cups and multiple flow control valves for the spill proof lid.

* * * * *